United States Patent [19]

Servatius

[11] Patent Number: 5,675,875
[45] Date of Patent: Oct. 14, 1997

[54] ADJUSTABLE BREAKAWAY

[76] Inventor: Richard James Servatius, 3608 Hertland Dr., Kettering, Ohio 45439

[21] Appl. No.: 690,759

[22] Filed: Aug. 1, 1996

[51] Int. Cl.⁶ ............................. F16B 21/00; A42B 3/04
[52] U.S. Cl. ................. 24/704.1; 24/602; 2/9; 2/424
[58] Field of Search ............... 2/9, 10, 422, 424, 2/425; 24/3.4, 597, 616, 633, 115 F, 602, 704.1; 411/1, 2, 3, 4

[56] References Cited

U.S. PATENT DOCUMENTS

| | | | |
|---|---|---|---|
| 2,867,812 | 1/1959 | Roth et al. | 2/424 |
| 3,065,747 | 11/1962 | Forkel | 24/616 |
| 4,233,687 | 11/1980 | Lancellotti | 2/425 |
| 4,398,323 | 8/1983 | Beard | 24/633 |
| 4,744,107 | 5/1988 | Fohl | 2/424 |
| 4,774,729 | 10/1988 | Coates et al. | 2/424 |
| 4,837,866 | 6/1989 | Rector et al. | 2/424 |
| 4,947,490 | 8/1990 | Hayden | 2/424 |
| 4,985,938 | 1/1991 | Snow, Jr. | 2/424 |
| 5,502,843 | 4/1996 | Strickland et al. | 2/424 |

FOREIGN PATENT DOCUMENTS 619956  10/1994  European Pat. Off. .............. 2/424

*Primary Examiner*—Michael A. Neas
*Attorney, Agent, or Firm*—Patent & Trademark Services; Joseph H. McGlynn; Thomas Zack

[57] ABSTRACT

An adjustable break away attachment have a base attached to one item and a disengageable attachment member held to the base by restraining pins. When sufficient tensile force is applied to the attachment member it will break away from its base pins. The attachment member has several notches formed in joined tapered surfaces where each notch engages a pin on its flattened side surface. By changing the pins, number, size, material or placement on the base the amount of break away tensile force needed to dislodge the attachment member can be varied. This invention has a great many applications, including but not limited to, a break away attachment for a football helmet's face mask.

8 Claims, 1 Drawing Sheet

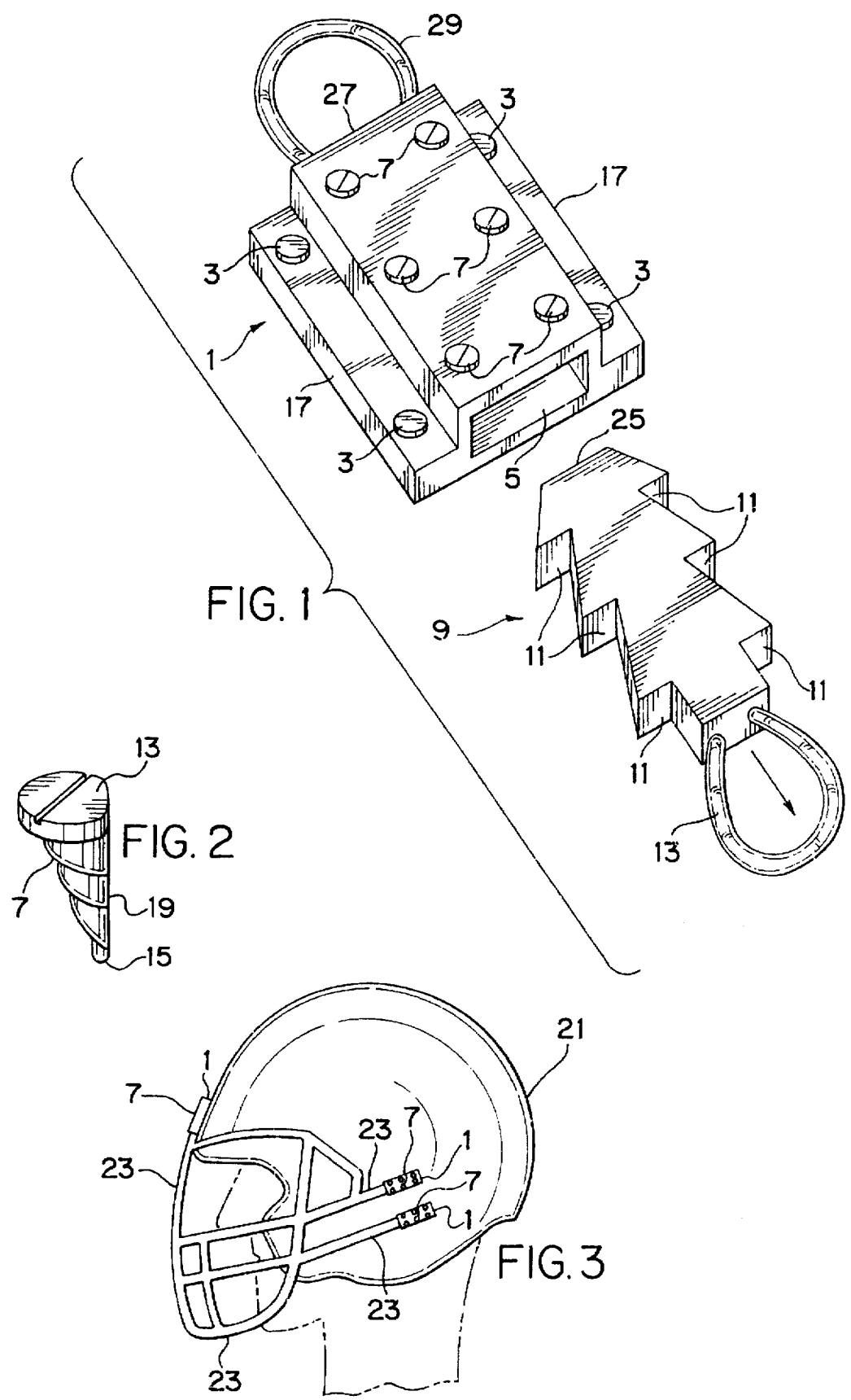

ADJUSTABLE BREAKAWAY

BACKGROUND OF THE INVENTION

The present invention relates to a breakaway fastener used to join two tension subjected elements together. Many items are joined together by members which are subject to tensioning forces, such as the straps used to hold a helmet to the head of a user. Normally, when subjected to an increasing amount of tensioning the connecting members may either break or, if the connected item is something worn by a user, create a situation where injury may result to the user as he or she is pulled along. The present invention seeks to reduce the possibility of injury or death to a user by providing for a adjustable breakaway connecting element which will disconnect when subject to a predetermined amount of tension.

DESCRIPTION OF THE PRIOR ART

In the prior art various types of wearing apparatus are disclosed with safety fasteners used to hold and breakaway when subjected to a certain amount of force. In the past one area that has utilized such safety devices is protective helmets. For example, in U.S. Pat. No. 4,744,107 to Fohl, a safety helmet with a detachable transparent safety shield plug is disclosed. Another reference, U.S. Pat. No. 4,744,729 to Coates et al., describes a face mask for a football or ice hockey helmet with a snap-in attachment which is detachable when subjected to sufficient pulling or twisting force but not when subjected to normal play. Hook and pile fasteners have been suggested (e.g., U.S. Pat. No. 4,947,490 to Hayden) for holding football helmet face masks. When subjected to a force towards the wearer's face these fasteners, it is asserted, prevent relative movement of the face mask but will break away in response to excessive forces in other directions. And in U.S. Pat. No. 4,985,938 to Snow, Jr. a three point attachment for a quick release face mask used in contact sports helmets is disclosed. The present invention provides for an adjustable break away connection which can be used for many purposes including protective helmet attachments as further described herein.

SUMMARY OF THE INVENTION

The present invention consists of a break away attachment. A main base assembly attached to an item, such as a protective helmet, has a hollow cavity with an entrance opening. A plurality of spaced pin members are disposed in this cavity and engage a cavity insertable attachment member. This attachment member is made up of a series of tapered pin engaging sides. By positioning the pins engagement with the attachment's taper sides the amount of tensioning force needed to release the attachment member from its base can be varied.

It is the primary object of the present invention to provide an improved detachable fastener.

It is a further object of the present invention to provide a detachable fastener which has a great variety of uses.

It is still another object of the present invention to provide a detachable fastener which can be used with a protective helmet.

These and other objects and advantages of the present invention will be fully apparent from the following description, when taken in connection with the annexed drawings.

BRIEF DESCRIPTION OF THE DRAWINGS

FIG. 1 is a perspective view of the preferred embodiment of the present invention.

FIG. 2 is a side view for one of the restraining pins invention used in FIG. 1.

FIG. 3 depicts the invention embodied in a protective helmet.

DESCRIPTION OF THE PREFERRED EMBODIMENT

Referring now to the drawings, in FIG. 1, there is shown a perspective view of the invention's preferred embodiment. The base member 1 which is attached to an item by fasteners 3 has an interior hollow cavity whose entrance opening 5 is shown. Extending into this interior cavity are a series of spaced pins 7. In this embodiment there are six spaced pins. These pins each engage the detachable attachment member 9 by bearing against one of its notched sides 11. When inserted into the base, the attachment member is sufficiently large such that it substantially fills the base's interior cavity. A loop 13 fixed to the attachment member 9 may be used to connect it to some external element not shown in this figure. When a pulling or tensioning force is applied in the direction of the arrow the loop and its attachment member are subjected to this force as well as the six engaged restraining pins 7 extending into the base's cavity. If this force is great enough the restraining pins will break and the attachment member 9 will be released from the base's cavity entrance 5.

A typical restraining pin is shown in FIG. 2. The pin is generally cone shaped tapering from an enlarged slotted 13 upper head to a smaller almost pointed base attachment lower end 15 similar in design and function to a conventional wood screw. When in place it is screwed into the lower flat surface 17 of base 1. At one pin side surface 19 the pin is flattened height wise from its upper larger head to its lower end 15. When in place in their base support 17, flattened side pin surfaces 19 engage each of the six notched surfaces 11 of attachment member 9. By changing the configuration or materials of the restraining pins or changing their numbers or locations relative to the detachable assembly 9, the mount of tensile force needed to release the assembly from its base 1 can be adjusted. For example, the pins 7 could be as shown in FIG. 2 and made of a breakable plastic material which is screwed into predrilled holes in the supporting base 17. By using only five, four or less pins, the amount of force needed to pull the assembly 9 from its base 1 would be decreased.

I envision may uses for my invention one of which is shown in FIG. 3. In this use a protective helmet 21, such as football helmet, has five base members 1 (three shown) fixed to it by fasteners 3. Two base members are on each side of the helmet and one on the top. Inserted within each base member is a detachable assembly 9 as previously described with respect to FIG. 1. Several restraining pins 7 made of nylon or a plastic material extend into the base's 1 internal cavity and engage the in place assembly 9. Attachment member 13 is not used in this application, however, attached to each free outwardly facing end of assembly 9 is a the molded plastic rigid face mask member 23. Each of these five face mask members 23 are joined together, as shown, and attached at their helmet engaging ends to the in-place disengageable assemblies 9. When the wearer's face mask is pulled or twisted either intentionally or accidentally, with sufficient force the assemblies 9 will become dislodged from their respective restraining pins and the face mask will come off the wearer. Pushing inwardly on the mask towards the player's face with the same force will not result in the mask coming off as the compression force will be transmitted not to its pins but to the assemblies' flattened front surface 25 (see FIG. 1) which abuts the flat interior front surface 27 of the fixed base 1.

Clearly, my invention is not limited to the single use shown for protective helmets. By using an optional base attachment line 29 anything that may be attached to it and the attachment loop 13 may employ the principles behind this invention. Examples include hold back fittings on board aircraft carrier catapults, parachute static lines break cord replacements, and garment attachments of all kinds where a detachable connection is desirable.

Although the Adjustable Breakaway and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A break away attachment comprising:

a base assembly adapted to be mounted to an item, said base having a hollow interior cavity with an entrance opening;

an attachment member having pin engaging side surfaces insertable into said base cavity through its entrance opening, said member having an extending end member to which tensile force may be applied; and a plurality of spaced restraining pin members mounted in said base assembly's interior cavity and positioned to engage the pin engaging surfaces of the attachment member to retain the member within the base's hollow cavity, said pin members being capable of breaking and releasing the attachment member from the base assembly when a sufficient amount of tensile force is applied to the extending end member.

2. The invention as claimed in claim 1, also including in combination a head piece with a protective face member mounted thereon, wherein said base assembly is mounted on the head piece with the attachment member holding the protective face member at its extending end to the base assembly, said face member being capable of being released from its held position when to sufficient tensile force is applied to its ending ends to break the restraining pin members.

3. The invention as claimed in claim 1, wherein said attachment member has a plurality of pin engaging notches each of which engages a restraining pin.

4. The invention as claimed in claim 3, wherein said base member has a flatten base support surface having fastening apertures.

5. The invention as claimed in claim 1, wherein each of said spaced restraining pin members has a surface which complements the engaging surface's shape of said insertable attachment member.

6. The invention as claimed in claim 5, wherein said insertable attachment member has tapered side edges which ends in a notched surface, each of said notched surfaces engaging a restraining pin.

7. The invention as claimed in claim 5, said end member including loop attachment means attached to said attachment member.

8. The invention as claimed in claim 2, wherein said protective helmet is a football helmet whose protective face mask ends are each attached to an attachment member.

* * * * *

UNITED STATES PATENT AND TRADEMARK OFFICE
CERTIFICATE OF CORRECTION

PATENT NO. : 5,675,875
DATED : October 14, 1997
INVENTOR(S) : Richard James Servatius It is certified that error appears in the above-identified patent and that said Letters Patent is hereby corrected as shown below:

On title page, item 76, delete "Richard James Servatius, 3608 Hertland Dr., Kettering, Ohio 45439" and insert --Richard James Servatius, 4830 43rd St., N.W., Washington, DC 20016--.

Signed and Sealed this

Twenty-fourth Day of March, 1998

Attest:

BRUCE LEHMAN

*Attesting Officer*      Commissioner of Patents and Trademarks